(12) United States Patent
Pitcher et al.

(10) Patent No.: US 10,223,922 B2
(45) Date of Patent: Mar. 5, 2019

(54) MISSION PARAMETERIZATION SYSTEM

(71) Applicant: Sikorsky Aircraft Corporation, Stratford, CT (US)

(72) Inventors: Garrett Pitcher, Cheshire, CT (US); Mark D. Ward, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/463,668

(22) Filed: Mar. 20, 2017

(65) Prior Publication Data

US 2017/0278403 A1 Sep. 28, 2017

Related U.S. Application Data

(60) Provisional application No. 62/312,175, filed on Mar. 23, 2016.

(51) Int. Cl.
| | |
|---|---|
| *G01C 23/00* | (2006.01) |
| *G08G 5/00* | (2006.01) |
| *G01S 17/93* | (2006.01) |
| *G08G 5/02* | (2006.01) |
| *G01S 13/91* | (2006.01) |
| *G06K 9/00* | (2006.01) |

(52) U.S. Cl.
CPC ............ *G08G 5/003* (2013.01); *G01C 23/00* (2013.01); *G01S 13/91* (2013.01); *G01S 17/933* (2013.01); *G08G 5/0021* (2013.01); *G08G 5/0073* (2013.01); *G08G 5/025* (2013.01); *G01S 13/913* (2013.01); *G06K 9/00637* (2013.01)

(58) Field of Classification Search
CPC .......... G08G 5/003; G01C 23/00; G01S 13/91
See application file for complete search history.

(56) References Cited

U.S. PATENT DOCUMENTS

| 2008/0198372 A1* | 8/2008 | Pan .................. B60Q 1/38 356/121 |
| 2009/0276105 A1* | 11/2009 | Lacaze ............. G05D 1/0044 701/2 |
| 2013/0200207 A1* | 8/2013 | Pongratz ........... B64C 39/024 244/2 |

FOREIGN PATENT DOCUMENTS

| EP | 2573584 A1 | 3/2013 |
| EP | 2708853 A1 | 3/2014 |
| EP | 2818957 A1 | 12/2014 |

(Continued)

OTHER PUBLICATIONS 17160822.7 Search Report dated Jul. 24, 2017, 10 pages.

*Primary Examiner* — Adam M Alharbi
(74) *Attorney, Agent, or Firm* — Cantor Colburn LLP

(57) ABSTRACT

A system for mission parameterization is provided and includes a vehicle that itself includes a sensor to sense characteristic sensed elements in surroundings of the vehicle and a computing device. The computing device includes a processing unit and a memory unit. The memory unit has a database configured to associate objects disposable in the surroundings with sensible characteristic object elements and executable instructions. The executable instructions are configured to cause the processing unit to find correspondence between any characteristic sensed elements in the surroundings, which are sensed by the activated sensor, and any of the characteristic object elements, identify objects in the surroundings based on the correspondence and set mission parameters based on identifications of the objects in the surroundings.

13 Claims, 4 Drawing Sheets

(56) References Cited

FOREIGN PATENT DOCUMENTS

| EP | 2996009 A1 | 3/2016 |
|----|------------|--------|
| JP | 2000085694 A | 3/2000 |

* cited by examiner

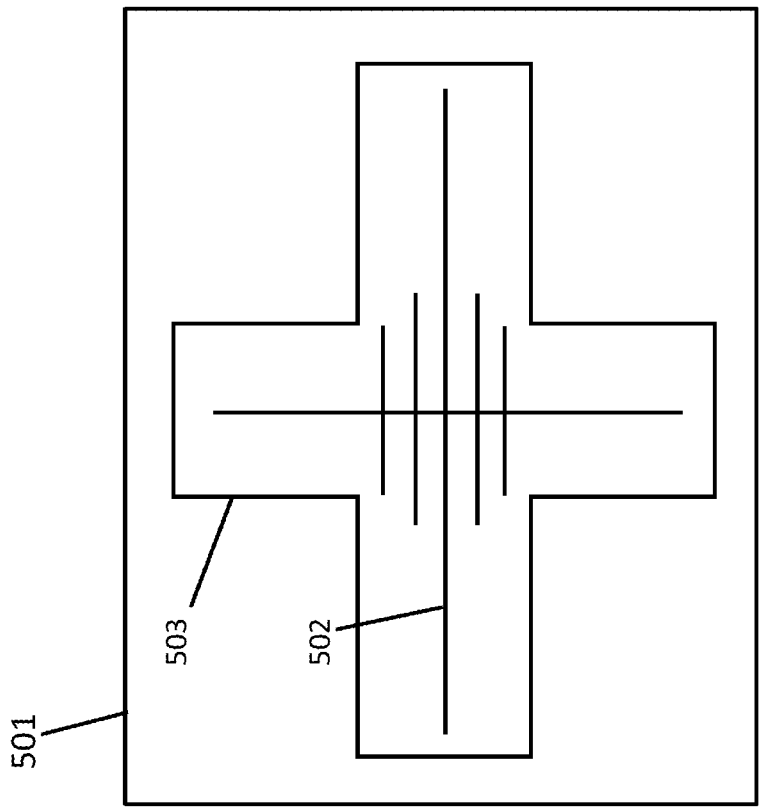

MISSION PARAMETERIZATION SYSTEM

CROSS-REFERENCE TO RELATED APPLICATIONS

This application claims benefit of priority of U.S. Provisional Application No. 62/312,175 filed Mar. 23, 2016, the disclosure of which is incorporated by reference.

BACKGROUND OF THE DISCLOSURE

The subject matter disclosed herein relates to a mission parametrization system and, more particularly, to a system for mission parametrization for use with an aircraft such as a helicopter.

During flight operations such as in-flight refueling, cargo pickup and landings, helicopter pilots often use ship deck features to plan and control vehicle positions, optimize flight paths and ensure safety. These ship deck features include lights, markings and ship structures and in some cases are specifically provided to guide aircraft approach vectors and landing operations, to provide indications of safe hover positions for in-flight refueling and vertical replenishment and to facilitate other operations. These features vary across various types of ships and among ships of similar type and therefore missions will be executed differently on different ships. Moreover, some ships may include multiple feature sets to indicate separate guidelines for separate aircraft executing different missions. As such, safe and successful mission completion is often complex and difficult to achieve.

BRIEF DESCRIPTION OF THE DISCLOSURE

According to one aspect of the disclosure, a system for mission parameterization is provided. The system includes a vehicle and the vehicle includes a sensor to sense characteristic sensed elements in surroundings of the vehicle and a computing device. The computing device includes a processing unit and a memory unit having a database configured to associate objects disposable in the surroundings with sensible characteristic object elements and executable instructions. The executable instructions are configured to cause the processing unit to find correspondence between any characteristic sensed elements in the surroundings, which are sensed by the activated sensor, and any of the characteristic object elements, identify objects in the surroundings based on the correspondence, and set mission parameters based on identifications of the objects in the surroundings.

In accordance with additional or alternative embodiments, the vehicle includes an aircraft.

In accordance with additional or alternative embodiments, the sensor includes a LIDAR sensor, a RADAR sensor or a video or image processor.

In accordance with additional or alternative embodiments, the objects in the surroundings of the vehicle include naval ships.

In accordance with additional or alternative embodiments, the characteristic object elements include ship edges, lights, markings and ship structures.

In accordance with additional or alternative embodiments, the mission parameters include at least one of refueling hover positions, cargo pickup positions, landing positions and approach vectors.

In accordance with additional or alternative embodiments, the vehicle includes a heads up display (HUD), which is controllable by the processing unit to alert a vehicle operator of set mission parameters.

In accordance with additional or alternative embodiments, the processing unit is configured to generate autonomous vehicle controls and to override operator input vehicle controls based on set mission parameters.

According to another aspect, a system for mission parameterization is provided and includes an aircraft and a computing device. The aircraft includes an airframe, a sensor supportively disposed on the airframe to sense characteristic sensed elements in surroundings of the aircraft. The computing device is configured to control various operations of the aircraft and includes a processing unit and a memory unit having a database and executable instructions stored thereon. The database is configured to associate objects disposable in the surroundings of the aircraft with sensible characteristic object elements. The executable instructions are configured to cause the processing unit to activate the sensor, find correspondence between any characteristic sensed elements in the surroundings of the aircraft, which are sensed by the activated sensor, and any of the characteristic object elements, identify objects in the surroundings of the aircraft based on the correspondence and set mission parameters based on identifications of the objects in the surroundings of the aircraft.

In accordance with additional or alternative embodiments, the sensor includes a LIDAR sensor, a RADAR sensor or a video or image processor.

In accordance with additional or alternative embodiments, the objects in the surroundings of the vehicle include naval ships.

In accordance with additional or alternative embodiments, the characteristic object elements include ship edges, lights, markings and ship structures.

In accordance with additional or alternative embodiments, the mission parameters comprise at least one of refueling hover positions, cargo pickup positions, landing positions and approach vectors.

In accordance with additional or alternative embodiments, the vehicle includes a heads up display (HUD), which is controllable by the processing unit to alert a vehicle operator of set mission parameters.

In accordance with additional or alternative embodiments, the processing unit is configured to generate autonomous vehicle controls and to override operator input vehicle controls based on set mission parameters.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 4 is a schematic illustration of a database of a memory unit of the computing device of FIG. 3;

FIG. 5 is a diagram illustrating a heads up display of the aircraft of FIG. 1.

The detailed description explains embodiments of the disclosure, together with advantages and features, by way of example with reference to the drawings.

DETAILED DESCRIPTION OF THE DISCLOSURE

As will be described below, a system for use with a vehicle, such as a ground-based vehicle or an aircraft includes sensors, a computing element and a database that can be referred to for guiding mission completion. The system classifies object features based on sensor inputs and uses the database to translate high-level mission requirements to low-level motion planning. For example, in a case of an aircraft required to perform an in-flight refueling mission, the system will sense deck markings and other naval ship features and use its database to determine the proper hover point for refueling at the naval ship.

With reference to FIGS. 1-5, a system is provided to facilitate mission parameterization for use with a vehicle, such as a ground-based vehicle or an aircraft. In the latter exemplary case, the aircraft may be, but is not required to be a helicopter 1. The following description will thus relate to the case where the vehicle is an aircraft and, more particularly, the helicopter 1 although it is to be understood that this is done for clarity and brevity and is not intended to limit the scope of the description in any way.

The helicopter 1 includes an airframe 2 having a top portion and a tail portion, a main rotor assembly that is operably disposed at the top portion and a tail rotor assembly that is operably disposed at the tail portion. The helicopter 1 further includes an engine and a transmission that are both supportively disposed within the airframe 2. The engine is configured to generate power to drive rotations of the main and tail rotor assemblies and the transmission is configured to transmit the generated power from the engine to the main and tail rotor assemblies. The rotations of the main rotor assembly generate lift and thrust for the helicopter 1 and the rotations of the tail rotor assembly provide for yaw control of the helicopter 1. At least the main rotor assembly is cyclically and collectively controllable to provide for directional flight control and to provide for increased or decreased thrust.

Although the helicopter 1 is described herein as having a simple helicopter configuration, it is to be understood that this is not required and that the helicopter 1 may have any one of multiple alternative helicopter configurations. The multiple alternative helicopter configurations include, but are not limited to, multiple rotor configurations and compound helicopter configurations with coaxial, counter-rotating main rotors and a propeller assembly.

The helicopter 1 further includes a sensor assembly 10 and a computing device 20.

Figure 2:
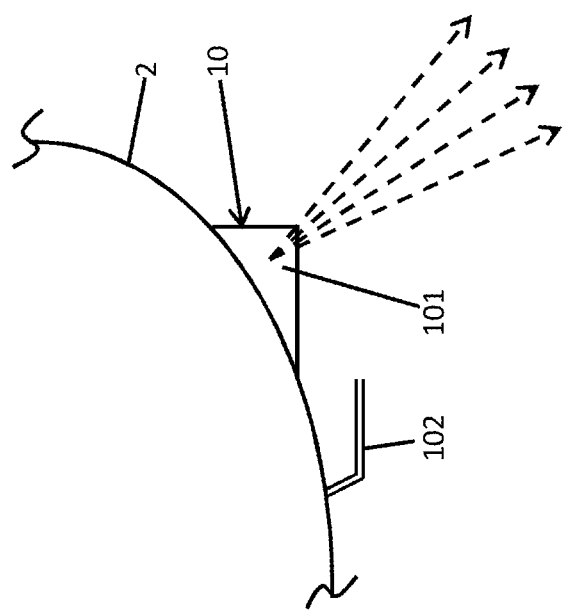
FIG. 2 is an enlarged portion of the aircraft of FIG. 1.

The sensor assembly 10 is supportively disposed on the airframe 2 and, as shown in FIG. 2, may be supportively disposed at a forward end (or nose) 201 of the airframe 2. The sensor assembly 10 may be provided as any one or more of a light detection and ranging (LIDAR) sensor system 101, a radio detection and ranging (RADAR) sensor system 102, a video or image processor or any other similar sensor system and is configured to sense various features, objects and elements in the environment surrounding the helicopter 1. In particular, the sensor assembly 10 is configured to sense characteristic sensed elements in the surroundings of the helicopter 1.

Figure 3:
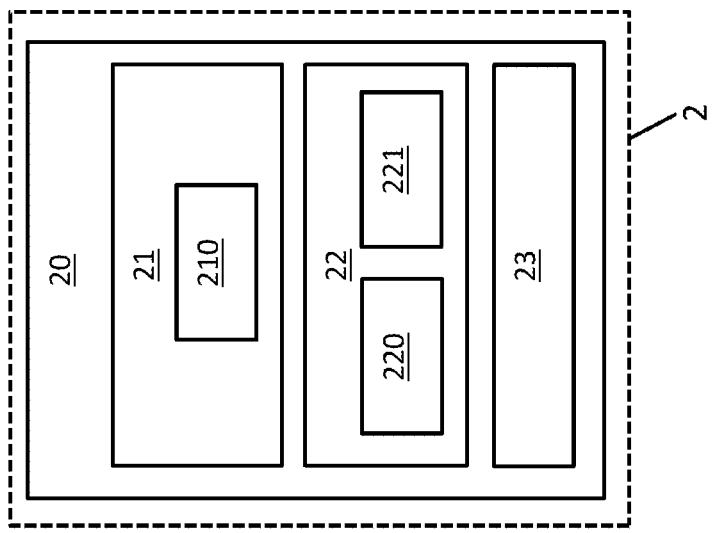
FIG. 3 is a schematic diagram illustrating a computing device of the aircraft of FIG. 1.

The computing device 20 configured to control various ground-based and in-flight operations of the helicopter 1. As shown in FIG. 3, the computing device 20 may be provided as a flight control computer (FCC) and includes a processing unit 21, a memory unit 22 and servo controllers 23. The processing unit 21 may be provide as any suitable type of processing circuitry and the servo controller 23 are disposable to operably couple the processing unit 21 to controllable features of the helicopter 1 (e.g., the main and tail rotor assemblies, the engine, the transmission, the cyclic and collective control elements of the main rotor assembly and the sensor assembly 10). The memory unit 22 has a database 220 and executable instructions 221 stored thereon in various types of suitable memory or storage units.

As shown in FIG. 4, the database 220 is configured to associate objects $2201_{1-n}$, which are disposable in the surroundings of the helicopter 1, with characteristic object elements $2202_{1-n}$, which are sensible by the sensor assembly 10 and which are respectively provided on one or more of the objects $2201_{1-n}$.

The executable instructions 221 are configured to cause the processing unit 21 to activate the sensor assembly 10 and to find correspondence between any characteristic sensed elements in the surroundings of the helicopter 1 that are sensed by the activated sensor assembly 10 and any of the characteristic object elements $2202_{1-n}$, stored in the database 220. The executable instructions 221 are further configured to cause the processing unit 21 to identify objects in the surroundings of the helicopter 1 (see, e.g., the naval ship 30 in FIG. 1) based on the correspondence found between the characteristic sensed elements and the characteristic object elements $2202_{1-n}$ and to set mission parameters for the helicopter 1 based on identifications of the objects.

Figure 1:
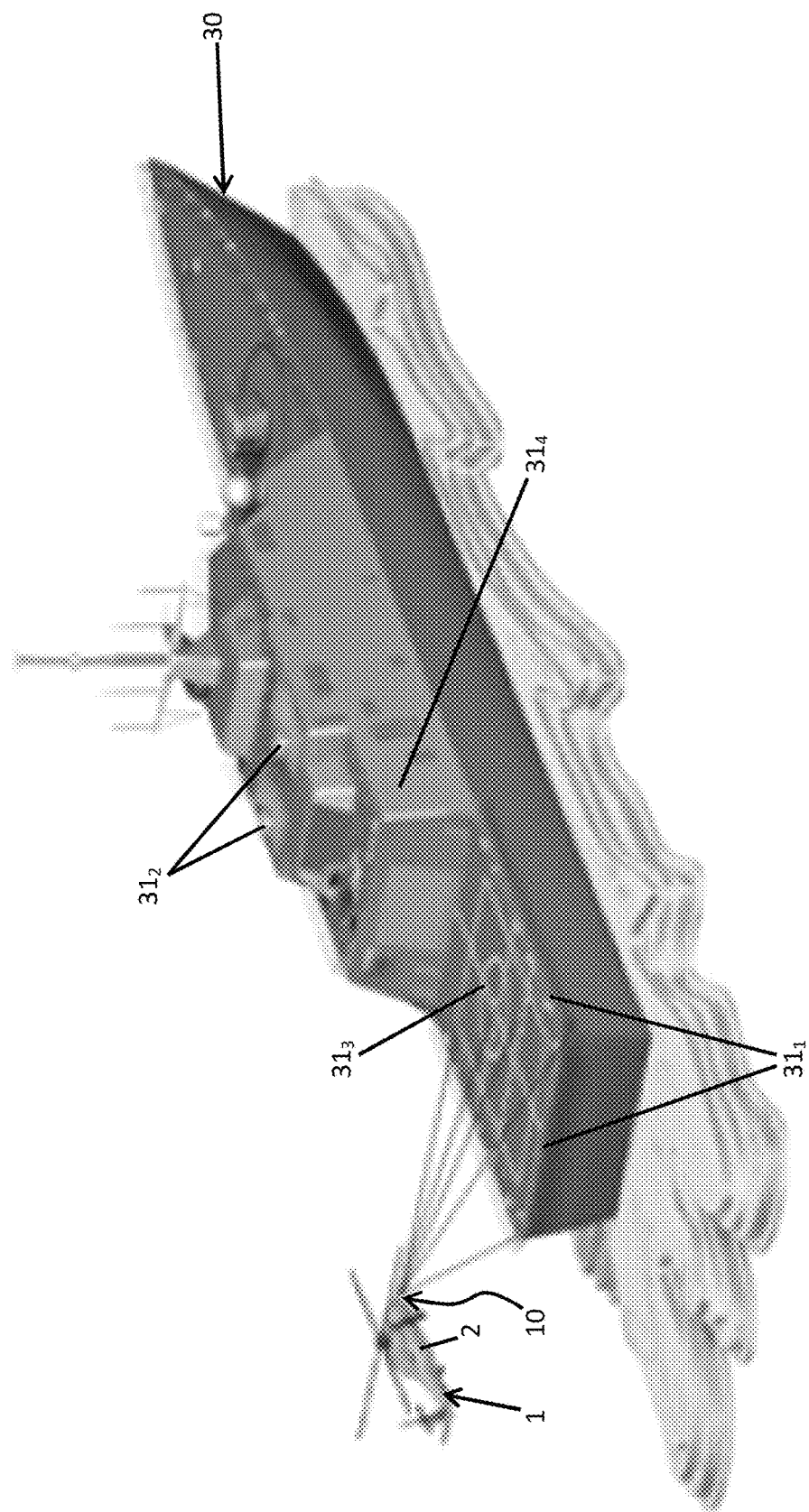
FIG. 1 is a perspective view of an aircraft flying proximate to a naval ship in accordance with embodiments.

In accordance with embodiments and, with reference to FIG. 1, the system described herein may facilitate various operations of the helicopter 1 that are executed in close or near proximity to the naval ship 30 such that the naval ship 30 is effectively an object that may be found in the surroundings of the helicopter 1. In such a case, the characteristic object elements $2202_{1-n}$ of the database 220 that are associated with the naval ship 30 by the database 220 may include ship edges $2202_1$ having for example a squared shape at the stern, lights $2202_2$ that are dispersed throughout the deck in a given pattern, markings $2202_3$ that delimit and identify a landing pad on the deck and ship structures $2202_4$, such as a command and control island above the deck. Thus, as the helicopter 1 approaches the naval ship 30 with the sensor assembly 10 activated during a given flight operation of a predefined mission, the sensor assembly 10 will sense various characteristic sensed elements of the surroundings of the helicopter 1, which could be one or more of the ship edges $31_1$, the lights $31_2$, the markings $31_3$ and the ship structures $31_4$ of the naval ship 30.

The processing unit 21 will then find correspondence or correlation between any of the characteristic sensed elements in the surroundings of the helicopter 1 that are sensed by the activated sensor assembly 10 and any of the characteristic object elements $2202_{1-n}$ stored in the database 220. Here, such correspondence may be manifest in the similarities between the ship edges $2202_1$ of the database 220 and the ship edges $31_1$ sensed by the sensor assembly 10, the similarities between the lights $2202_2$ of the database 220 and the lights $31_2$ sensed by the sensor assembly 10, the similarities between the markings $2202_3$ of the database 220 and the markings $31_3$ sensed by the sensor assembly 10 and the similarities between the ship structures $2202_4$ of the database 220 and the ship structures $31_4$ sensed by the sensor assembly 10.

At this point, the processing unit 21 identifies the naval ship 30 as being an object in the surroundings of the helicopter 1 based on any one or more of the above-described instances of correspondence. That is, any one or more of the ship edges $31_1$, the lights $31_2$, the markings $31_3$ and the ship structures $31_4$ of the naval ship 30 effectively identify the naval ship 30 to the computing device 20 by way of reference made to the database 220 by the processing unit 21. Subsequently, the processing unit 21 sets mission parameters for the helicopter 1 based on the identification of the naval ship 30 as an object in the surroundings of the helicopter 1.

In accordance with embodiments, the mission parameters may relate to at least one of refueling hover positions, cargo pickup positions, landing positions and approach vectors. As such, once the naval ship 30 is identified by the processing unit 21, the processing unit 21 may set positional ranges for where the helicopter 1 can safely hover above the naval ship 30 during refueling or cargo pickups, vertical positioning and descent velocity during landings and ranges of approach vectors during landing approaches. For example, some naval ships have certain features crossing over the landing pad and thus if the processing unit determines that the naval ship 30 has one such feature (e.g., a tow line or cable crossing over the landing pad), the processing unit 21 will set a vertical position range during a refueling operation that maintains the helicopter 1 safely above the feature in question.

With reference to FIG. 5, the helicopter 1 may include or feature a heads up display (HUD) 501 that is provided to the operator or pilot to inform him of important mission data. In such cases, the processing unit 21 may control the HUD populate the HUD 501 to alert the operator or pilot of set mission parameters and to generate a visual display of the set mission parameters. For example, during an approach of the helicopter 1 toward the naval ship 30, the HUD 501 may show the operator or pilot first crosshairs 502 that are representative of the actual approach vector of the helicopter 1 and second crosshair ranges 503 that encourage the operator or pilot to keep the first crosshairs 502 on target to thereby facilitate the operator's or pilot's efforts to remain in a proper approach vector once the naval ship 30 is identified as described above.

As an additional feature, the processing unit 21 may be configured to operate autonomously or as an operator assistance system. In the former case, the processing unit 21 may be configured to generate autonomous vehicle controls based on the set mission parameters. In the latter case, the processing unit 21 may assist or, if necessary, override operator or pilot input vehicle controls based on the set mission parameters. The autonomous features of the processing unit 21 may allow the processing unit 21 to parameterize and effectively complete a given mission without operator or pilot input. In this case, an operator (in the aircraft or on the ground) will just input a command to complete a mission, such as "deliver cargo to ship X," and the processing unit 21 will compute mission parameters as described, which will then be interpreted by a non-human mission manager (e.g., intelligent software 210 as shown in FIG. 3) to execute the mission. The non-autonomous features of the processing unit 21 could be employed to either assist the operator or pilot in a difficult flight operation or to prevent the operator or pilot from making a mistake in that difficult flight operation. That is, in an exemplary refueling case in high seas where the naval ship 30 is rolling with the ocean swell and is thus pitching relative to the helicopter 1, the processing unit 21 will calculate minor target adjustments of the helicopter 1 that will allow refueling to continue safely and may provide for improved or even corrected operator or pilot commands.

Figure 6:
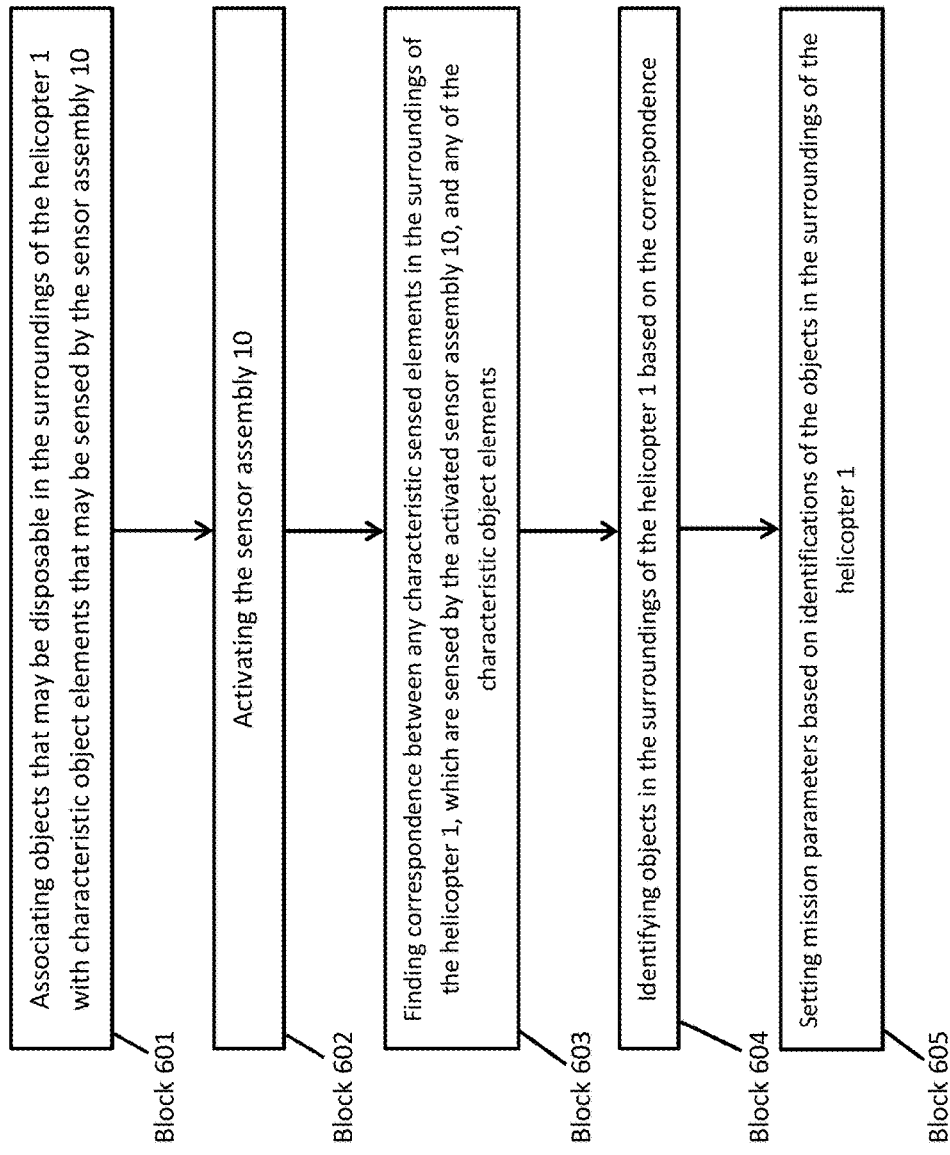
FIG. 6 is a flow diagram illustrating a mission parametrization method for use with an aircraft.

With reference to FIG. 6, a method of mission parametrization is provided. As shown in FIG. 6, the method includes associating objects that may be disposable in the surroundings of the helicopter 1 with characteristic object elements that may be sensed by the sensor assembly 10 (block 601), activating the sensor assembly 10 (block 602), finding correspondence between any characteristic sensed elements in the surroundings of the helicopter 1, which are sensed by the activated sensor assembly 10, and any of the characteristic object elements (block 603), identifying objects in the surroundings of the helicopter 1 based on the correspondence (block 604) and setting mission parameters based on identifications of the objects in the surroundings of the helicopter 1 (block 605).

The description provided above relates to features that may reduce the workload of the operators or pilots of various types of vehicle and thus may provide for increased safety. Such advantages may be particularly apparent especially in a degraded visual environment, where the operator or pilot may have difficulty seeing markings, lights and other ship features. The description also relates to a system that enables identification of unknown ships, provided that the system has some a priori knowledge of ship features that are detected by the sensor assembly 10.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A system for mission parameterization, comprising:
a vehicle comprising a sensor to sense characteristic elements in surroundings of the vehicle and a computing device comprising:
a processing unit; and
a memory unit having a database configured to associate vehicles with sensible characteristic elements and executable instructions configured to cause the processing unit to:
sense characteristic elements including one or more of a vehicle marking, a vehicle structure, vehicle lights, and edges of a vehicle disposed in the surroundings;
find correspondence between any of the characteristic elements detected in the surroundings, sensed by the activated sensor, and any of the characteristic elements in the memory unit,
identify a vehicle disposed in the surroundings based on the correspondence, and
set mission parameters based on identifications of the vehicle.

2. The system according to claim 1, wherein the vehicle comprises an aircraft.

3. The system according to claim 1, wherein the sensor comprises a LIDAR sensor, a RADAR sensor or a video or image processor.

4. The system according to any of claims 1-3, wherein the identified vehicle comprise naval ships.

5. The system according to claim 1, wherein the mission parameters comprise at least one of refueling hover positions, cargo pickup positions, landing positions and approach vectors.

6. The system according to claim 1, wherein the vehicle comprises a heads up display (HUD), which is controllable by the processing unit to alert a vehicle operator of set mission parameters.

7. The system according to claim 1, wherein the processing unit is configured to generate autonomous vehicle controls and to override operator input vehicle controls based on set mission parameters.

8. A system for mission parameterization, comprising:

an aircraft comprising an airframe, a sensor supportively disposed on the airframe to sense characteristic sensed elements in surroundings of the aircraft and a computing device configured to control various operations of the aircraft, the computing device comprising:

a processing unit; and a memory unit having a database and executable instructions stored thereon, the database being configured to associate vehicles with sensible characteristic elements and the executable instructions being configured to cause the processing unit to:

activate the sensor, sense characteristic elements including one or more of a vehicle marking, a vehicle structure, vehicle lights, and edges of a vehicle;

find correspondence between any characteristic elements detected in the surroundings of the aircraft, which are sensed by the activated sensor, and any of the characteristic elements stored in the memory unit, identify a vehicle based on the correspondence, and set mission parameters based on identifications of the vehicle.

9. The system according to claim 8, wherein the sensor comprises a LIDAR sensor, a RADAR sensor or a video or image processor.

10. The system according to claim 8, wherein the the vehicle comprise naval ships.

11. The system according to claim 8, wherein the mission parameters comprise at least one of refueling hover positions, cargo pickup positions, landing positions and approach vectors.

12. The system according to claim 8, wherein the vehicle comprises a heads up display (HUD), which is controllable by the processing unit to alert a vehicle operator of set mission parameters.

13. The system according to claim 8, wherein the processing unit is configured to generate autonomous vehicle controls and to override operator input vehicle controls based on set mission parameters.

* * * * *